Nov. 2, 1926.

R. McC. JOHNSTONE 1,605,190

CLUTCH MECHANISM

Filed Jan. 28, 1924     4 Sheets-Sheet 1

INVENTOR
Robert McC Johnstone
BY
ATTORNEY

Nov. 2, 1926.
R. McC. JOHNSTONE
CLUTCH MECHANISM
Filed Jan. 28, 1924
1,605,190
4 Sheets-Sheet 2
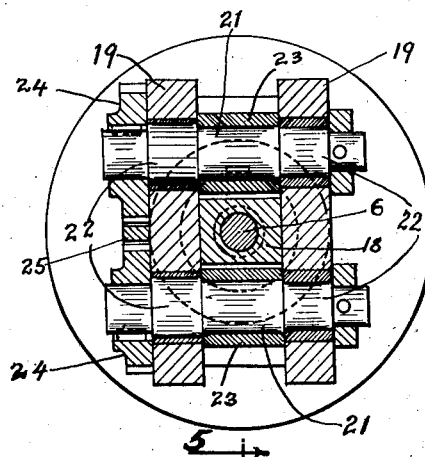
Fig: 3.
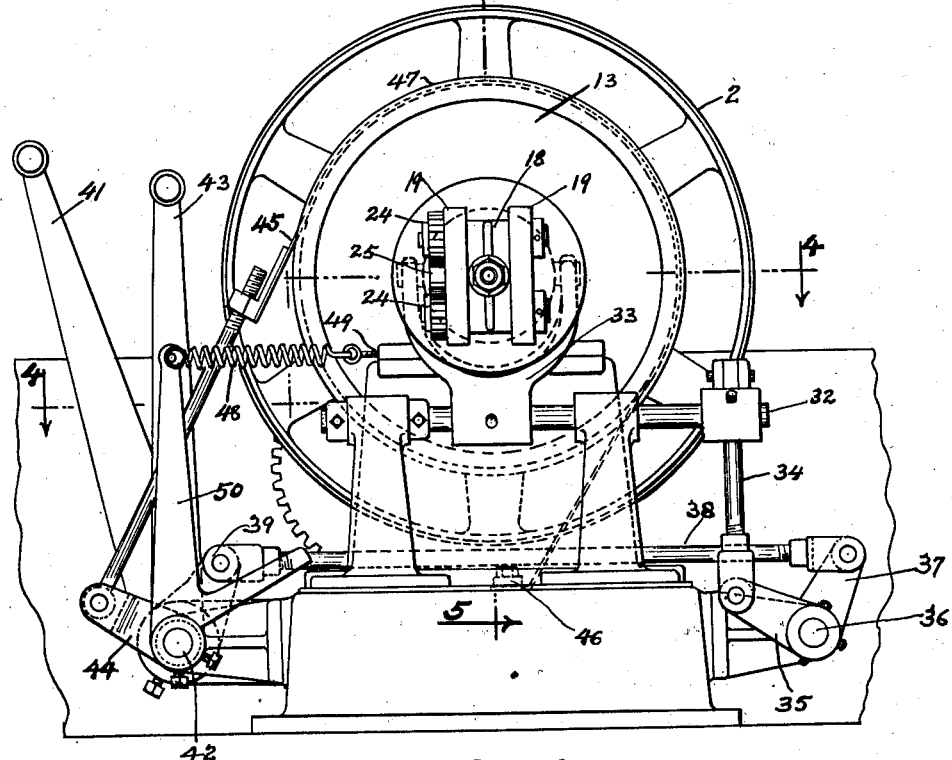
Fig: 2.
INVENTOR
Robert McC Johnstone
BY
ATTORNEY

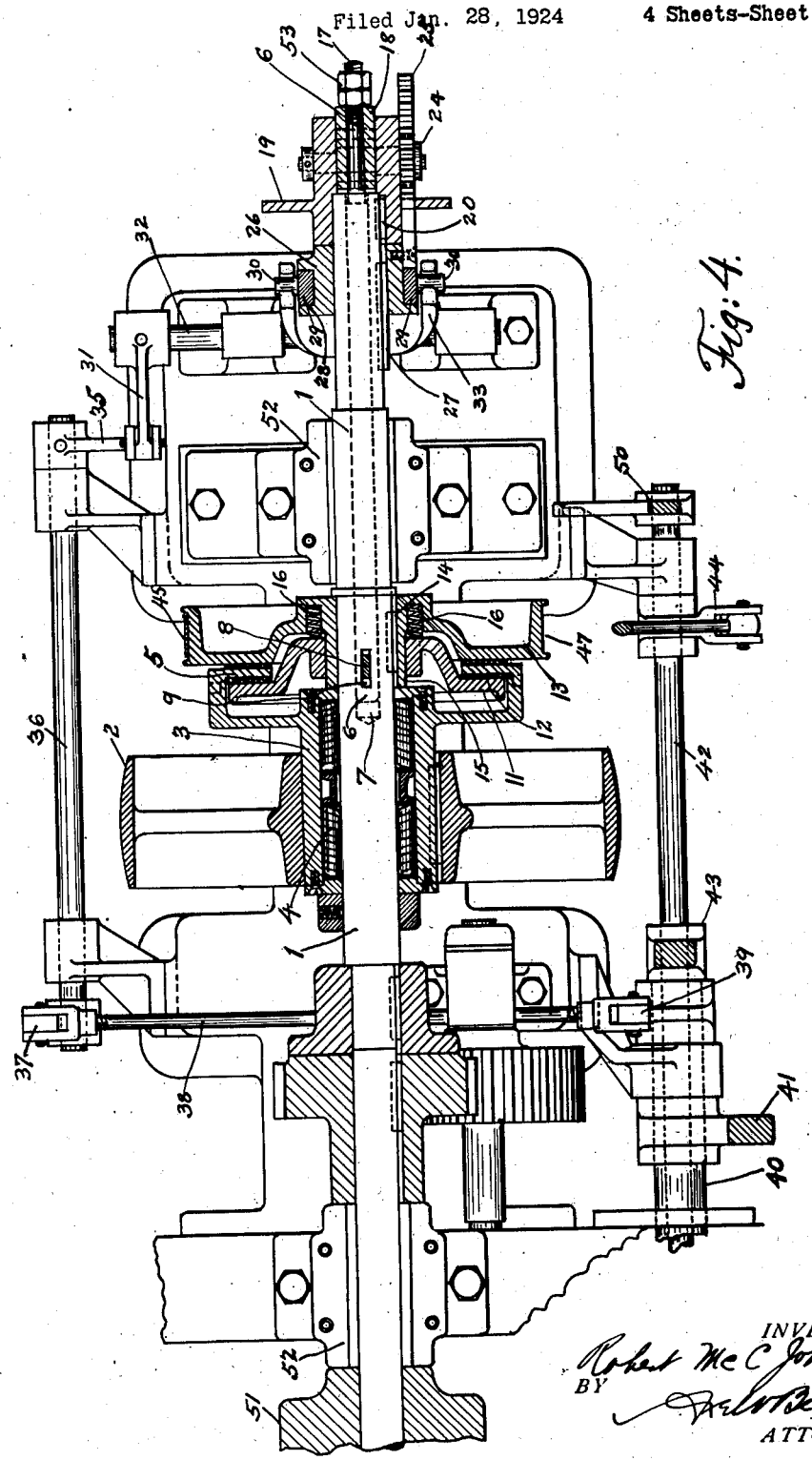

Nov. 2, 1926.

R. McC. JOHNSTONE

CLUTCH MECHANISM

Filed Jan. 28, 1924

INVENTOR
Robert McC. Johnstone
BY
ATTORNEY

Patented Nov. 2, 1926.

1,605,190

UNITED STATES PATENT OFFICE.

ROBERT McC. JOHNSTONE, OF ROSELLE PARK, NEW JERSEY, ASSIGNOR TO CAMERON MACHINE COMPANY, OF BROOKLYN, NEW YORK, A CORPORATION OF NEW YORK.

CLUTCH MECHANISM.

Application filed January 28, 1924. Serial No. 688,975.

This invention relates generally to clutch mechanism and has for its main object and feature the devising of an improved clutch mechanism for a slitting and winding machine of the character disclosed in Patent No. 1,465,967 of August 28, 1923 although, of course, the clutch mechanism may be used in a wide variety of machines.

In the accompanying drawings, the invention is disclosed in a concrete and preferred form in which—

Fig. 2 is an end elevation looking in the direction of arrows 2—2 of Fig. 1.

Fig. 3 is a transverse vertical sectional view on the plane of line 3—3 of Fig. 1.

Fig. 4 is a horizontal sectional view on the plane of line 4—4 of Fig. 2.

Figure 5:
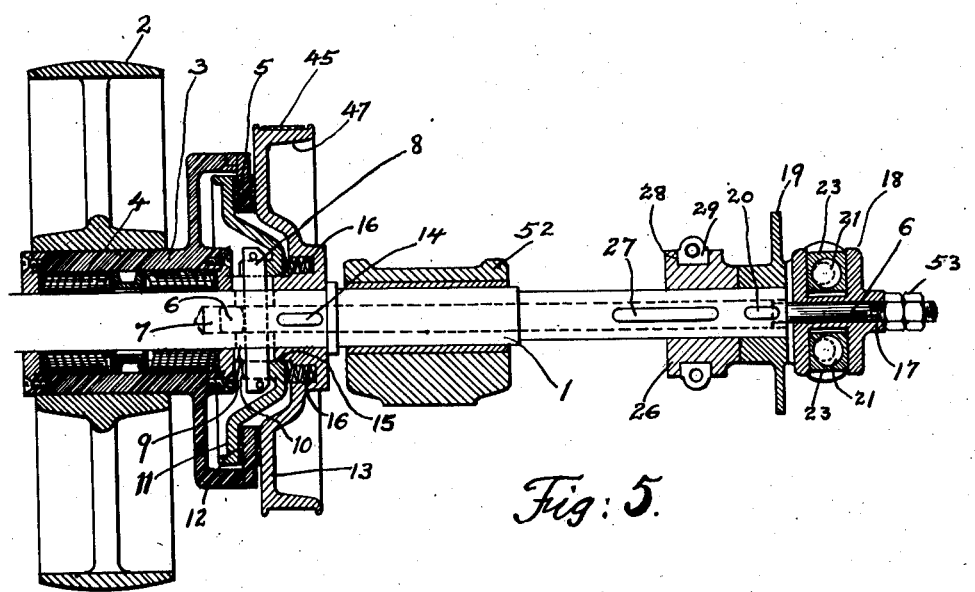
Fig. 5 is a longitudinal vertical sectional view on the plane of line 5—5 of Fig. 2.

Referring more particularly to Figs. 4 and 5, the numeral 1 indicates a rotatable member or shaft to be driven. 2 is a pulley, or other driving element, by means of which power is to be applied to the shaft. This pulley is secured to a collar or sleeve 3 between which latter and the shaft is interposed roller bearing 4. The pulley is therefore loose on the shaft. Carried by sleeve 3 is a flanged member having a movable friction plate 5. 6 is a clutch actuating rod that extends longitudinally of the shaft and preferably in a bore 7 within the shaft and said rod is longitudinally slidable in said shaft. Extending transversely through the rod is a bar 8 that projects through slots 9 in shaft 1 and engages in slots 10 of member 11 which member has a friction face 12. When faces 5 and 12 engage, it will be evident that rotation of pulley 2 and member 3 will be imparted, through member 11 and bar 8, to shaft 1 and these elements would therefore constitute a clutch. It is preferred, however, to transmit the power more definitely to the shaft and to this end there is a driven member 13 that has a friction face adjacent face 5. This driven member is fastened, as by means of key 14, to shaft 1 and affords a seat 15 for support of member 11. It will now be understood that when rod 6 is moved endwise to the right in Fig. 5 member 11 will bring face 5 against member 13 with sufficient force to impart rotation to member 13 and hence to the shaft. When the power, acting on rod 6, ceases to be effective, springs 16 in member 13 move member 11, and hence rod 6, to the left in Fig. 5 and the parts become unclutched. It will therefore be understood that actuating rod or member 6 is coincident with the axes of the driving and driven members and that, by reason of radially extending bars 8, pressure is applied equally in all directions from said axes: also, that by adjusting said rod longitudinally the pressure between the driving and driven members will be varied.

Any suitable means may be employed for the purpose of moving rod 6 lengthwise of its axis and for adjusting it to vary the pressure between the driving and driven members but, preferably, these parts are constructed as follows, reference now being made to all of the drawings.

Rod 6, as here shown, projects beyond the end of shaft 1 and secured to this rod, as by means of threaded portion 17, is a slide 18 moving in ways of guide 19, this guide being secured to shaft 1 by means of key 20 or otherwise. A suitable cam mechanism is used to actuate the slide. In the particular embodiment of the invention here disclosed, two eccentrics 21, carried by rotatable members 22 mounted in guide 19, are employed. These eccentrics extend through boxes 23 movable in slide 18 and by their turning movement effect lengthwise movement of the rod. The turning movement of these cams or eccentrics is, in the present instance, effected as follows: mounted on the end of each rotatable member 22 is a gear 24 with which engages a double-faced rack 25 slidably mounted in guide 19 and secured to slidable member 26 on shaft 1 which member slides on key 27 of shaft 1.

Various instrumentalities may be used to effect sliding motion of member 26 notwithstanding its rotation with shaft 1. As here shown, this member has an annular groove 28 in which is seated a loose ring 29 having pins 30. A bell crank 31 pivotally supported at 32 has two forked arms 33, each arm engaging a pin 30. This bell crank is actuated by rod 34 connected, by means of arm 35, with rockshaft 36, which has an arm 37 connected, by means of transverse rod 38, with arm 39 of sleeve 40, the sleeve being provided with an operating lever 41.

Extending through sleeve 40 is a shaft 42 carrying operating lever 43 and carrying also an arm 44 secured to one end of a brake band 45, the other end of this brake band being anchored at 46 on the framework. The brake band surrounds brake drum 47 conveniently forming a part of member 13. A spring 48 secured, at one end, to the framework at 49 is attached, at its other end, to arm 50 mounted on shaft 42, this spring acting to slacken the brake band.

The machine to which this invention is here shown applied as an illustration is a slitting and winding machine such as is disclosed in Patent No. 1,465,967 and shaft 1 is an extension of one of the winding drums 51, preferably the rear winding drum, of said machine;-but it is obvious that the invention may be employed in other relations as well.

Shaft 1 is mounted in suitable bearings 52 and other bearings are provided for the various rockshafts, sleeves etc. as will be understood.

Figure 1:
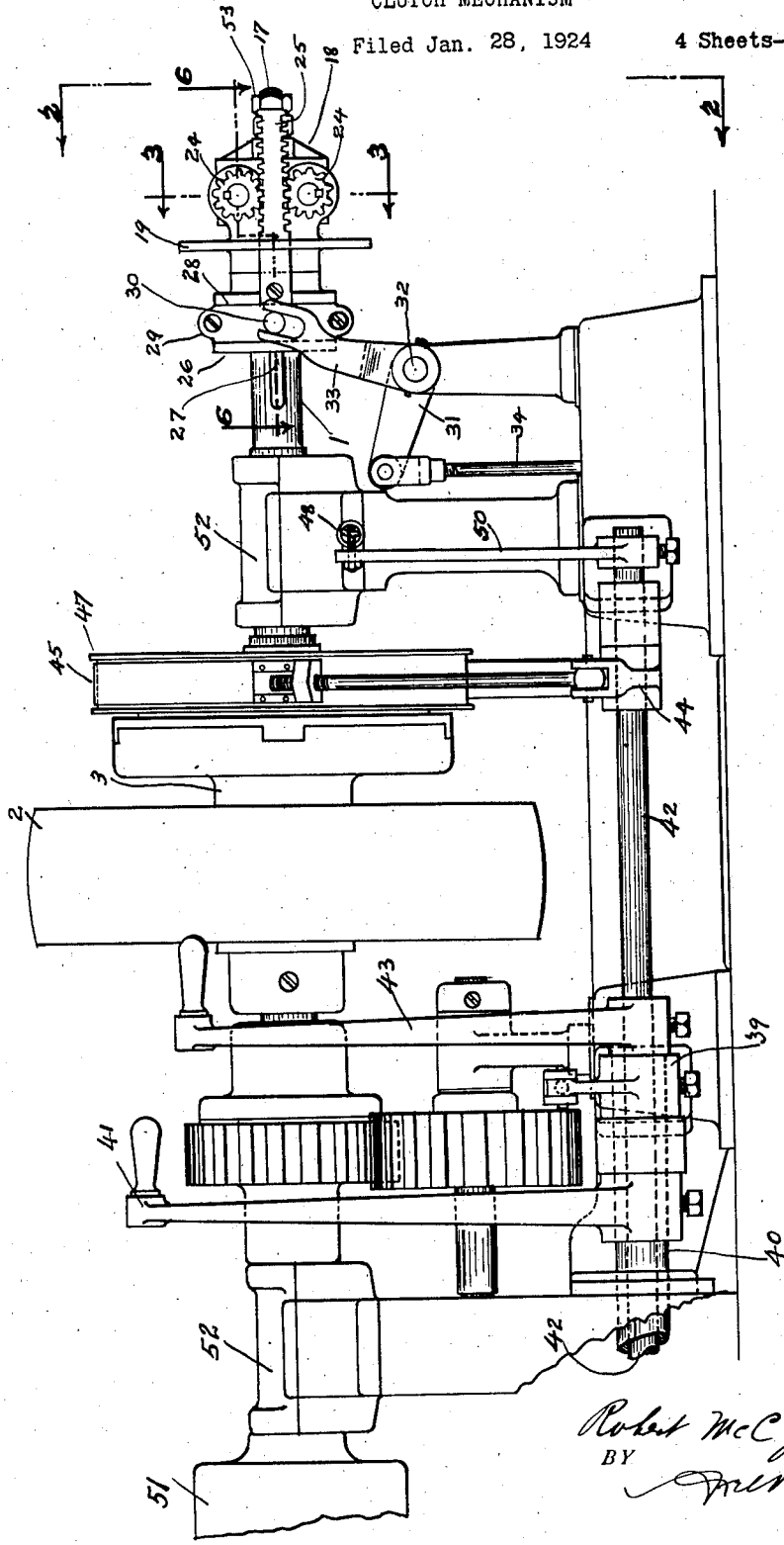
Fig. 1 is a side elevation of a device embodying the invention.
Figure 6:
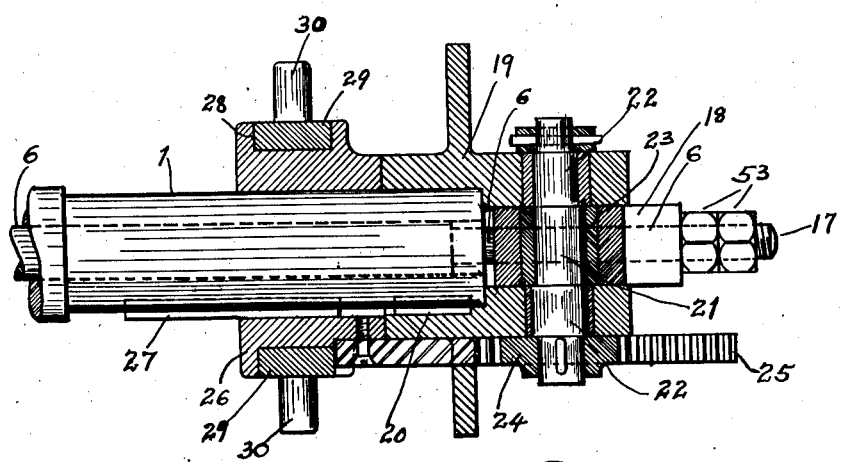
Fig. 6 is a horizontal sectional view on the plane of line 6—6 of Fig. 1.

Attention is again directed to Figs. 5 and 6 where it will be seen that threaded portion 17 and nuts 53 afford an adjusting point whereby rod 6 may be lengthwise adjusted to cause the clutch members to engage with more or less pressure.

I claim:

1. Clutch actuating mechanism including: a rotatable member, a guide rotatable with said member, a slide movable in said guide, a cam carried by said guide and engaging said slide, clutch members carried by said rotatable member, connections between said slide and clutch members extending through said rotatable member and a slidable member, on said rotatable member, connected to said slide.

2. Clutch actuating mechanism including: a rotatable member, a guide rotatable with said member, a slide movable in said guide, a cam carried by said guide and engaging said slide, clutch members carried by said rotatable member, connections between said slide and clutch members, a slidable member on said rotatable member, a gear connected to the cam, and a rack actuated by the slidable member to engage the gear.

3. Clutch actuating mechanism including: a rotatable member, a guide rotatable with said member, a slide movable in said guide, a cam carried by said guide and engaging said slide, clutch members carried by said rotatable member, connections between said slide and clutch members, a slidable member on said rotatable member, a gear connected to the cam, and a rack actuated by the slidable member to engage the gear and extending through said guide.

4. Clutch actuating mechanism including: a shaft, a clutch actuating rod extending through the shaft and projecting from the end thereof, a slidable member mounted on the shaft, a guide carried by the shaft adjacent the projecting end of the rod, a slide in said guide and attached to the rod, a rotatable cam in said guide to engage the slide to move the rod, and transmission means to convert the motion of the slidable member into a rotatable movement of the cam.

5. Clutch actuating mechanism including: a shaft, a clutch actuating rod extending through the shaft and projecting from the end thereof, a slidable member mounted on the shaft, a guide carried by the shaft adjacent the projecting end of the rod, a slide in said guide and attached to the rod, a rotatable cam in said guide to engage the slide to move the rod, and a rack and a gear to convert the motion of the slidable member into a rotatable movement of the cam.

6. Clutch actuating mechanism including: a shaft, a clutch actuating rod extending through the shaft and projecting from the end thereof, a slidable member mounted on the shaft, a guide carried by the shaft adjacent the projecting end of the rod, a slide in said guide and attached to the rod, two rotatable cams in said guide to engage the slide to move the rod, and means to convert the motion of the slidable member into a rotatable movement of the cams.

7. Clutch actuating mechanism including: a shaft, a clutch actuating rod extending through the shaft and projecting from the end thereof, a slidable member mounted on the shaft, a guide carried by the shaft adjacent the projecting end of the rod, a slide in said guide and attached to the rod, two rotatable cams in said guide to engage the slide to move the rod, and a double-faced rack and two gears engaging opposite faces of the rack to convert the motion of the slidable member into a rotatable movement of the cams.

8. Clutch actuating mechanism including: a rotatable shaft, a guide rotatable with said shaft, a slide movable in said guide, a cam carried by said guide and engaging said slide, clutch members carried by said shaft, a clutch actuating rod extending through said shaft to connect the slide and clutch members, and a slidable member, on said shaft, connected to said slide.

9. Clutch actuating mechanism including: a rotatable shaft, a guide rotatable with said shaft, a slide movable in said guide, a cam carried by said guide and engaging said slide, clutch members carried by said shaft, a clutch actuating rod extending through said shaft to connect the slide and clutch members, a slidable member on said shaft, a gear connected to the cam, and a rack actuated by the slidable member and engaging the gear.

10. Clutch actuating mechanism including: a rotatable shaft, a guide rotatable with said shaft, a slide movable in said guide, a cam carried by said guide and engaging said slide, clutch members carried by said shaft, a clutch actuating rod extending through said shaft to connect the slide and clutch members, a slidable member on said shaft, a gear connected to the cam, and a rack, extending through the guide, actuated by the slidable member and engaging the gear.

11. Clutch actuating mechanism including: a shaft, a clutch actuating rod extending through the shaft and projecting from the end thereof, a slidable member mounted on the shaft, a guide carried by the shaft adjacent the projecting end of the rod, a slide in said guide and attached to the rod, a rotatable cam in said guide to engage the slide to move the rod, transmission means to convert the motion of the slidable member into a rotatable movement of the cam, and means for adjusting the slide and rod with respect to each other.

12. Clutch actuating mechanism including: a rotatable shaft, a guide rotatable with said shaft, a slide movable in said guide, a cam carried by said guide and engaging said slide, clutch members carried by said shaft, a clutch actuating rod extending through said shaft to connect the slide and clutch members, and means for adjusting the slide and rod with respect to each other.

Signed at New York city, in the borough of Brooklyn, county of Kings, and State of New York, this 18 day of January, 1924.

ROBERT McC. JOHNSTONE.